(12) United States Patent
Tsai et al.

(10) Patent No.: US 8,643,993 B2
(45) Date of Patent: Feb. 4, 2014

(54) SHORT-CIRCUIT DETECTION CIRCUIT AND SHORT-CIRCUIT DETECTION METHOD

(75) Inventors: Kuo-Chen Tsai, Zhubei (TW); Wei-Lun Hsieh, Kaohsiung (TW); Tung-Han Tsai, Tainan (TW); Ming-Jun Hsiao, Zhubei (TW)

(73) Assignee: Richtek Technology Corporation, R.O.C., Chupei, Hsin-Chu (TW)

( * ) Notice: Subject to any disclaimer, the term of this patent is extended or adjusted under 35 U.S.C. 154(b) by 51 days.

(21) Appl. No.: 13/370,561

(22) Filed: Feb. 10, 2012

(65) Prior Publication Data
US 2013/0128395 A1    May 23, 2013

(30) Foreign Application Priority Data

Nov. 18, 2011 (TW) .............................. 100142182 A

(51) Int. Cl.
*H02H 3/08* (2006.01)
*H02H 9/02* (2006.01)

(52) U.S. Cl.
USPC ................ 361/93.7; 361/93.1; 361/87; 361/5

(58) Field of Classification Search
USPC ...................................... 361/93.1, 93.7, 87, 5
See application file for complete search history.

(56) References Cited

U.S. PATENT DOCUMENTS

| | | | | |
|---|---|---|---|---|
| 6,414,400 B1 * | 7/2002 | Scott et al. | ................... | 290/40 C |
| 6,967,488 B1 * | 11/2005 | Arigliano | ...................... | 324/656 |
| 7,782,023 B2 * | 8/2010 | Holguin | .......................... | 322/28 |
| 7,964,987 B2 * | 6/2011 | Isobe et al. | ................... | 307/10.8 |
| 8,212,570 B1 * | 7/2012 | Farrow | .......................... | 324/509 |

* cited by examiner

*Primary Examiner* — Rexford Barnie
*Assistant Examiner* — Zeev V Kitov
(74) *Attorney, Agent, or Firm* — Tung & Associates

(57) ABSTRACT

The present invention discloses a short-circuit detection circuit and a short-circuit detection method. The short-circuit detection circuit detects whether an output node is short-circuited to a first predetermined level. A first switch circuit which is controlled by a control signal is coupled between the output node and a second predetermined level. The short-circuit detection circuit includes: a determination circuit, which is coupled between the output node and the second predetermined level, wherein when the determination circuit is enabled, it generates a determination signal according to whether the output node is short-circuited to the first predetermined level; and a second switch circuit, which generates a short-circuit detection signal according to the determination signal.

17 Claims, 5 Drawing Sheets

SHORT-CIRCUIT DETECTION CIRCUIT AND SHORT-CIRCUIT DETECTION METHOD

CROSS REFERENCE

The present invention claims priority to TW 100142182, filed on Nov. 18, 2011.

BACKGROUND OF THE INVENTION

1. Field of Invention

The present invention relates to a short-circuit detection circuit and a short-circuit detection method; particularly, it relates to such short-circuit detection circuit and short-circuit detection method for use in a circuitry with a capacitive load circuit.

2. Description of Related Art

A power supply circuit usually provides over temperature protection (OTP) and output current limit (OCL) as short-circuit protection mechanisms for an output node.

However, with respect to the OTP mechanism, it takes tens of microseconds to generate a protection signal to trigger a protection action, because heat has a low conduction speed via a silicon substrate. When the output node is short-circuited, the circuitry may have already been damaged before the OTP mechanism triggers the short-circuit protection action.

The OCL mechanism is faster and therefore is better for use as the output node short-circuit protection mechanism; however, it immediately limits the driving capability of the circuitry when OCL occurs. Therefore, undesirable side effects may occur when the OCL mechanism is used as the output node short-circuit protection mechanism, especially when the circuitry is a power supply circuit which requires a higher driving capability to drive a capacitive load circuit.

In view of above, to overcome the drawbacks in the prior art, the present invention proposes a short-circuit detection circuit and a short-circuit detection method, which can be used in the power supply circuit that requires a higher driving capability to drive a capacitive load circuit.

SUMMARY OF THE INVENTION

The first objective of the present invention is to provide a short-circuit detection circuit.

The second objective of the present invention is to provide a short-circuit detection method.

To achieve the objectives mentioned above, from one perspective, the present invention provides a short-circuit detection circuit for detecting whether an output node is short-circuited to a first predetermined level, wherein the output node is coupled to a capacitive load circuit, and the output node is also coupled to a second predetermined level via a first switch circuit controlled by a control signal, the short-circuit detection circuit including: a determination circuit coupled between the output node and the second predetermined level, which, when enabled, generates a determination signal according to whether the output node is short-circuited to the first predetermined level; and a second switch circuit, which generates a short-circuit detection signal according to the determination signal.

In one embodiment, the short-circuit detection circuit preferably further includes an enable switch circuit, which is controlled by the control signal to enable the determination circuit.

In another embodiment of the short-circuit detection circuit, the second switch circuit preferably includes a switch which has a first end coupled to the second predetermined level and a second end for generating the short-circuit detection signal, the switch being controlled by the determination signal. The second switch circuit preferably further includes a resistant circuit coupled between the switch and the second predetermined level In yet another embodiment, the determination circuit preferably includes a first resistant circuit and a second resistant circuit connected in series, wherein the determination signal is related to a division voltage at a node between the first resistant circuit and the second resistant circuit.

In yet another embodiment, the short-circuit detection circuit preferably further includes an abnormal condition handling circuit including a deglitch circuit and a comparison circuit, which are coupled to each other, for removing a noise from the short-circuit detection signal, and generating a short-circuit control signal according to the short-circuit detection signal. And the abnormal condition handling circuit preferably further includes a current-to-voltage conversion circuit, which is coupled to the deglitch circuit, for generating a voltage signal according to the short-circuit detection signal when the short-circuit detection signal is a current signal.

In the aforementioned embodiment, the abnormal condition handling circuit preferably further includes a timer circuit, which is coupled to the comparison circuit, so that the generated short-circuit control signal lasts for a predetermined period of time.

In yet another embodiment, the abnormal condition handling circuit preferably further includes a logic circuit, which performs a logic operation according to the short-circuit control signal and an operation signal to generate the control signal for controlling the first switch circuit, wherein when the output node is not short-circuited to the first predetermined level, the first switch circuit is controlled by the operation signal, and when the output node is short-circuited to the first predetermined level, the first switch circuit is controlled by the short-circuit control signal and is turned OFF.

From another perspective, the present invention provides a short-circuit detection method for detecting whether an output node is short-circuited to a first predetermined level, wherein the output node is coupled to a capacitive load circuit, and the output node is also coupled to a second predetermined level via a first switch circuit controlled by a control signal, the short-circuit detection method including: receiving the control signal, and coupling or not coupling the output node to the second predetermined level according to the control signal; generating a determination signal according to voltage difference between the output node and the second predetermined level; and generating a short-circuit detection signal according to the determination signal.

In one embodiment, the short-circuit detection method preferably further includes: converting the short-circuit detection signal to a voltage signal when the short-circuit detection signal is a current signal.

In another embodiment, the step of generating the determination signal preferably includes: coupling a determination circuit between the output node and the second predetermined level, the determination circuit including a first resistant circuit and a second resistant circuit connected in series, wherein the determination signal is related to a division voltage at a node between the first resistant circuit and the second resistant circuit; and determining whether to enable the determination circuit according to the control signal.

In yet another embodiment, the short-circuit detection method preferably further includes: removing a noise from the short-circuit detection signal, and comparing it with a reference signal to generate a short-circuit control signal. And after the comparison step, the short-circuit detection method preferably further includes: counting a predetermined time so that the generated short-circuit control signal lasts for the predetermined time.

The objectives, technical details, features, and effects of the present invention will be better understood with regard to the detailed description of the embodiments below.

DESCRIPTION OF THE PREFERRED EMBODIMENTS

Figure 1:
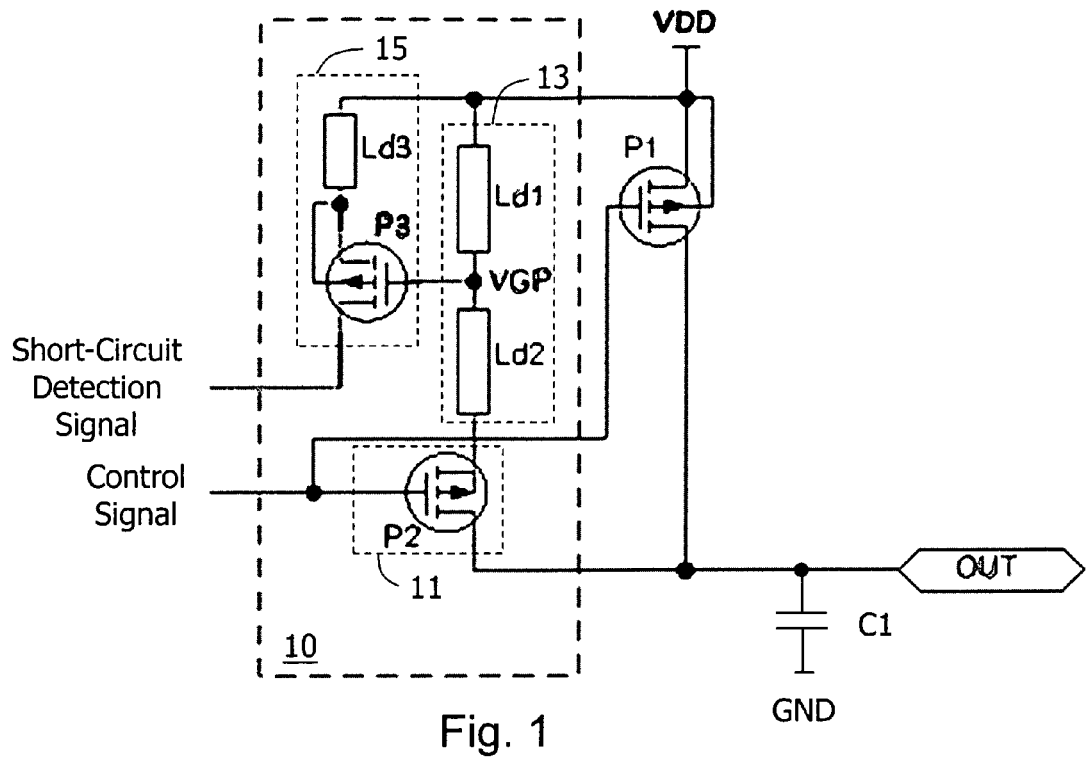
FIG. 1 shows a first embodiment of the present invention.

FIG. 1 shows a first embodiment of the present invention. The short-circuit detection circuit 10 shown in the figure is for detecting whether an output node OUT is short-circuited to a first predetermined level. The first predetermined level is for example but not limited to a ground level GND or a very low level. A first switch circuit which includes a first transistor P1 is coupled between the output node OUT and a second predetermined level (for example but not limited to a supply level VDD). The first transistor P1 is operated by a control signal to electrically connect the output node OUT to the supply level VDD, for driving a capacitive load circuit C1. The short-circuit detection circuit 10 includes an enable switch circuit 11, a determination circuit 13, and a second switch circuit 15. The enable switch circuit 11 includes a second transistor P2, which receives the aforementioned control signal and determines whether to enable the determination circuit 13 according to the control signal. The determination circuit 13 is coupled between the supply level VDD and the output node OUT. In this embodiment, the determination circuit 13 includes a first resistant circuit Ld1 and a second resistant circuit Ld2 connected in series as shown in the figure. The first resistant circuit Ld1 and the second resistant circuit Ld2 are for example but not limited to wires, resistors, current sources, diodes, metal oxide semiconductor (MOS) devices, bipolar junction transistor (BJT) devices, or a combination of two or more of the aforementioned devices. In normal operation, i.e., when the output node OUT is not short-circuited to the ground level GND or a very low level, as the first transistor P1 is turned ON, the supply level VDD charges the capacitive load circuit C1, so the level of the output node OUT is close to the VDD level. The voltage across the determination circuit 13 is very low, so the voltage at the node VGP is very close to the supply level VDD. On the other hand, when the output node OUT is short-circuited to the ground level GND or a very low level, as the control signal turns ON the second transistor P2, the voltage across the determination circuit 13 is much higher than that in the normal operation, so the voltage at the node VGP is relatively lower than that in the normal operation. The different voltages at the node VGP in the normal operation and the short-circuit condition may be used to determine whether a third transistor P3 of the second switch circuit 15 is turned ON or not, and a short-circuit detection signal may be generated (depending on whether the third transistor P3 is a P-type or an N-type device, a short-circuit condition may be indicated by a high or low level of the short-circuit detection signal, or by whether there is current flowing through the third transistor P3). The third transistor P3 for example is connected to the supply level VDD through a third resistant circuit Ld3, so as to generate a current when the third transistor P3 is conductive. The third resistant circuit Ld3 is for example but not limited to a wire, a resistor, a current source, a diode, a MOS device, a BJT device, or a combination of two or more of the aforementioned devices. In another embodiment, the third resistant circuit Ld3 may be omitted, and the third transistor P3 is directly connected to the supply level VDD, as long as the short-circuit detection signal can be properly generated and processed (for example, by a circuit or device connected to the lower end of the third transistor P3, not shown). In summary, the voltage difference at the node VGP between the normal operation and the short-circuit condition will lead to a change of the short-circuit detection signal, and such change may be used to indicate the short-circuit condition for corresponding measures to be taken. The short-circuit detection signal may be a current signal or a voltage signal. The short-circuit detection signal shown in FIG. 1 is a current signal; however, if the lower end (current outflow end) of the third transistor P3 is coupled to a predetermined level through a resistant device, then the short-circuit detection signal may be converted to a voltage signal.

In the aforementioned embodiment, the transistors of the enable switch circuit 11 and the second switch circuit 15 are shown for example as MOS devices, but they can be replaced by BJT devices. The first, second, and third transistors P1, P2, and P3 are shown to be PMOS devices, but each of them can be an NMOS device instead.

Figure 2:
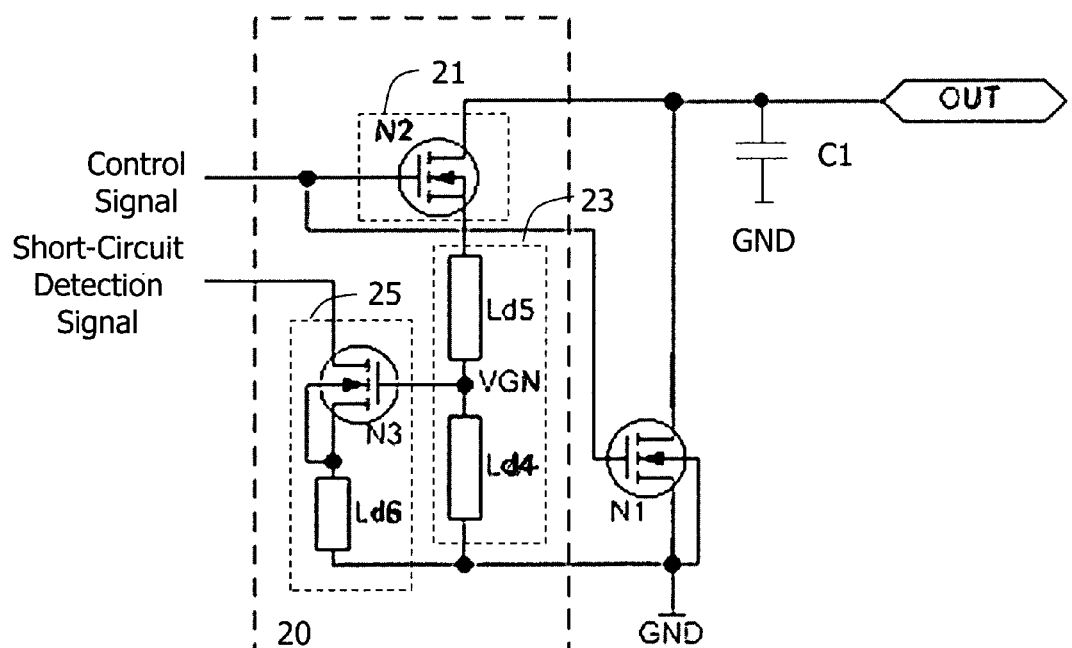
FIG. 2 shows a second embodiment of the present invention.

FIG. 2 shows a second embodiment of the present invention. This embodiment is different from the first embodiment in that it is for detecting whether the output node OUT is short-circuited to the supply level VDD or a very high level. In the figure, a first transistor N1, a second transistor N2, and a third transistor N3 are shown as NMOS devices, but each of them can be a PMOS device instead. The operation principle of this embodiment is similar to the first embodiment, but the first predetermined level is the supply level VDD and the second predetermined level is the ground level GND in this embodiment. And because NMOS devices are used, the meanings or functions of the high and low levels of the control signal and the short-circuit detection signal are contrary to the control signal and the short-circuit detection signal in the first embodiment. As shown in FIG. 2, the first transistor N1 is coupled between the output node OUT and ground level GND, and controlled by the control signal to electrically connected the output node OUT to the ground level GND, for driving the capacitive load circuit C1. The short-circuit detection circuit 20 includes an enable switch circuit 21, a determination circuit 23, and a second switch circuit 25. The enable switch circuit 21 includes the second transistor N2, which receives the control signal, to determine whether to enable the determination circuit 23. The determination circuit 23 is coupled between the output node OUT and the ground level GND; it includes for example but not limited to a fourth resistant circuit Ld4 and a fifth resistant circuit Ld5, which are connected in series as shown in the figure. The determination circuit 23 generates a division voltage at the node VGN. The second switch circuit 25 includes the third transistor N3, which is controlled by a voltage at the node VGN. The third transistor N3 for example is connected to the ground level GND through a sixth resistant circuit Ld6.

Figure 3:
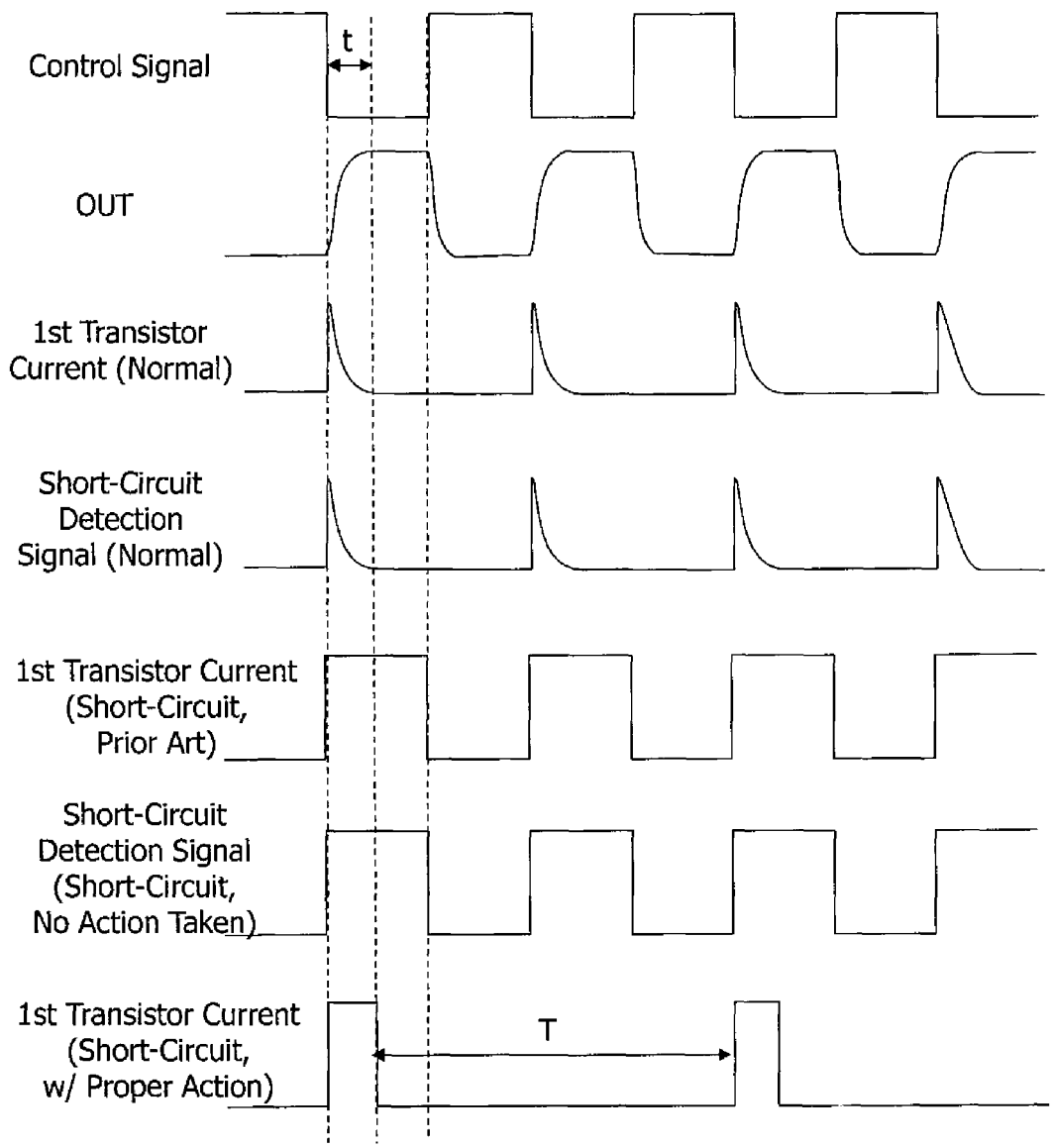
FIG. 3 shows signal waveforms at several nodes in the first embodiment.

FIG. 3 shows an example of signal waveforms of several nodes in the first embodiment to explain its operation. As shown in FIG. 3, when the control signal is at low level, the first transistor P1 is conductive, and the output node OUT is electrically connected to the supply level VDD. Because the load driven by the circuitry is a capacitive load circuit C1, at an initial stage of the conductive period of the transistor P1, a charging time t is required to charge the output node OUT until it is close to the supply level VDD. Therefore, in a normal operation, i.e., when the output node OUT is not short-circuited to the ground level GND or a very low level, it is possible for the determination signal generated at the node VGP to change the conduction state of the third transistor P3 only during the charging time t, but not after the charging time t. That is, the short-circuit detection signal will not be generated after the charging time t. Therefore, if the noise in the charging time t is filtered, it can be confirmed that the output node OUT is not short-circuited to the ground level GND or the very low level. On the contrary, when the output node OUT is short-circuited to the ground level GND or the very low level, and when the control signal turns ON the second transistor P2, the determination signal generated at the node VGP changes the conduction state of the third transistor P3 to generate the short-circuit detection signal, which lasts even after the charging time t. Therefore, even though the noise during the charging time t is filtered, it can still be confirmed that the output node OUT is short-circuited to the ground level GND or the very low level.

The lowest waveform in the bottom of FIG. 3 shows that, according to the present invention, when the output node OUT is short-circuited to the ground level GND or the very low level, a proper action can be taken (referred to as "abnormal condition handling"), such that the control signal turns OFF the first transistor P1 for a predetermined time T and then turns ON it again, and if the short-circuit condition is detected again, the control signal turns OFF the first transistor P1 again for the time T. This is advantageous in that the circuitry is not turned OFF immediately, such that if the abnormal condition is only a transient state and is fixed within a short time, the circuitry can resume to normal operation quickly, while before the abnormal condition is fixed, the circuitry is protected from damages because of the low power consumption during the abnormal condition. More specifically, assume that the duty ratio in normal operation is 1/2, and the output current in short-circuit condition is IOUT. According to the present invention, the output power may be reduced from $(1/2)*VDD*IOUT$ to $[t/(T+t)]*VDD*IOUT$. Therefore, by controlling the ratio of t to T (for example but not limited to 1/1000), the circuitry may be protected from damages, and can resume to normal operation immediately once the abnormal condition is fixed. Certainly, it is also practicable and within the scope of the present invention that the circuitry is immediately turned OFF once it is detected that the output node OUT is short-circuited to the ground level GND or the very low level.

Figure 4:
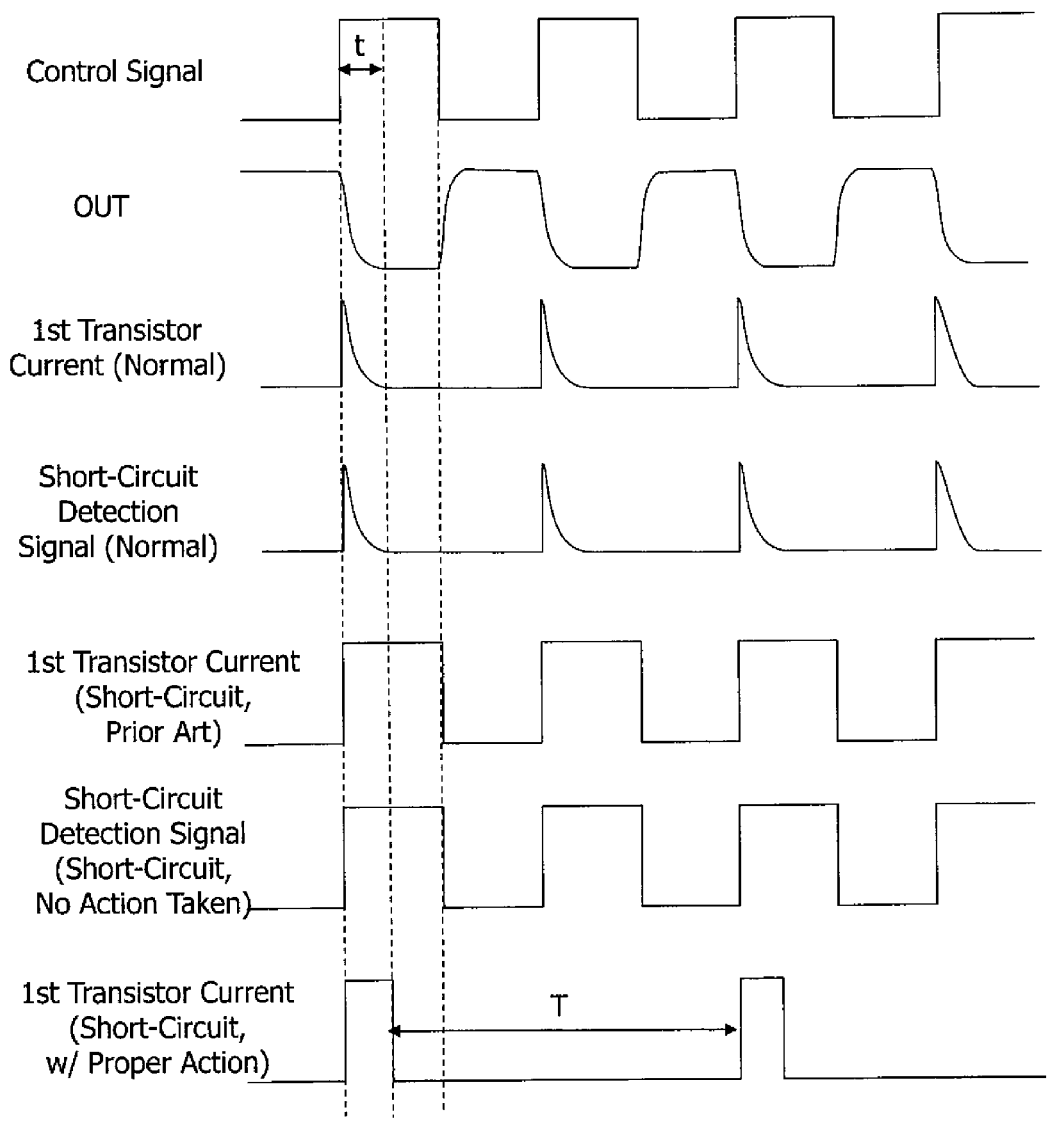
FIG. 4 shows signal waveforms at several nodes in the second embodiment.

FIG. 4 is an example showing signal waveforms of several nodes in the second embodiment. The waveforms are similar to those in FIG. 3, except that the transistors are NMOS devices, and the first predetermined level and the second predetermined level are changed to the supply level VDD and the ground level GND respectively.

Figure 5:
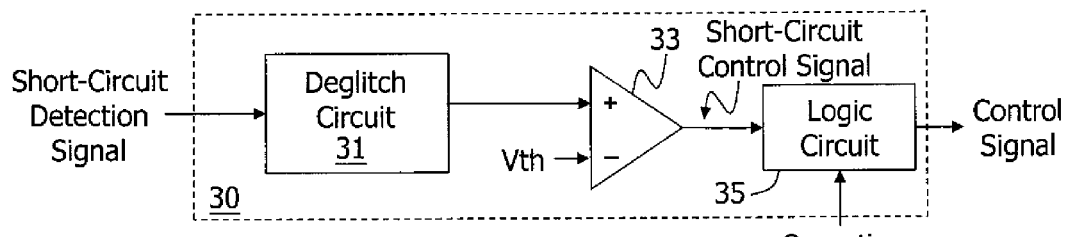
FIG. 5 shows a third embodiment of the present invention.

FIG. 5 shows a third embodiment of the present invention, which is an example for handling the abnormal condition. As shown in FIG. 5, the short-circuit detection circuit 10 or 20 may further include an abnormal condition handling circuit 30, which includes a deglitch circuit 31 and a comparison circuit 33. The deglitch circuit 31 receives the short-circuit detection signal, and filters the noise in the short-circuit detection signal. The comparison circuit 33 compares the filtered short-circuit detection signal with a reference signal Vth, and generates a short-circuit control signal according to the comparison result. In one embodiment, the short-circuit control signal may be used to turn OFF the circuitry directly, or in another embodiment as shown in the figure, the short-circuit control signal may be processed by a logic circuit 35 to generate the control signal shown in FIG. 1 or 2. The operation signal shown in the figure is a signal for operating the first transistor P1 or N1 in normal operation, such as a pulse width modulation (PWM) signal. The logic circuit 35 performs a logic operation according to the short-circuit control signal and the operation signal, and generates the control signal to operate or to turn OFF the first transistor P1 or N1. In other words, in normal operation, the first transistor P1 or N1 is controlled by the operation signal; and in the short-circuit condition, the first transistor P1 or N1 is turned OFF by the short-circuit control signal. Note that, the relative positions of the deglitch circuit 31 and the comparison circuit 33 can be interchanged, that is, within the scope of the present invention, the short-circuit detection signal can be compared with the reference signal Vth first, and then the noise is filtered from the comparison result, to generate the short-circuit control signal. Also note that the comparison circuit 33 may be replaced by a Smith trigger; a Smith trigger changes state at a predetermined threshold level, so it may be considered as an embodiment of a comparison circuit, because it compares its input with the predetermined threshold level.

Figure 6:
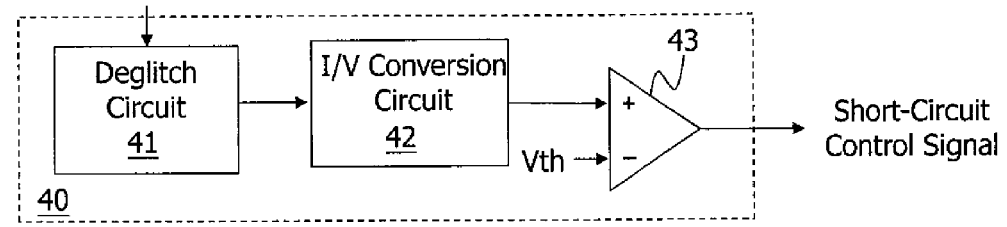
FIG. 6 shows a fourth embodiment of the present invention.

FIG. 6 shows a fourth embodiment of the present invention. As shown in FIG. 6, an abnormal condition handling circuit 40 may further include a current-to-voltage (I/V) conversion circuit 42, which is coupled to a deglitch circuit 41. The I/V conversion circuit 42 converts the short-circuit detection signal to a voltage signal, and the voltage signal is inputted to a comparison circuit 43 which compares it with the reference signal Vth to generate the control signal. This embodiment shows an example that the abnormal condition handling circuit 40 does not include the logic circuit 35, and it outputs the short-circuit control signal directly. The short-circuit control signal for example may be used to turn OFF the entire circuitry, rather than not just turn OFF the first transistor P1 or N1.

Figure 7:
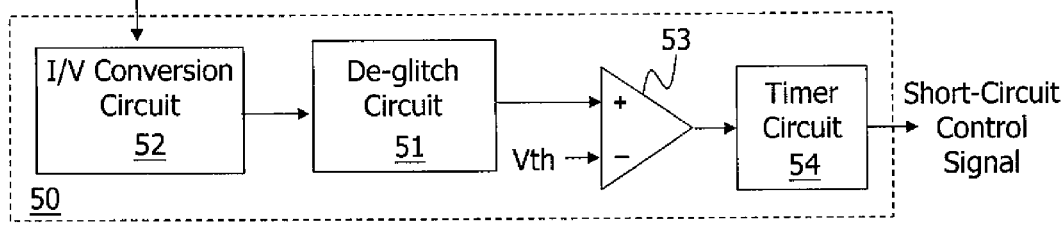
FIG. 7 shows a fifth embodiment of the present invention.

FIG. 7 shows a fifth embodiment of the present invention. As shown in FIG. 7, an abnormal condition handling circuit 50 may further include a timer circuit 54 besides a deglitch circuit 51, an I/V conversion circuit 52, and a comparison circuit 53. The timer circuit 54 is coupled to the comparison circuit 53, and it counts a predetermined time period T. The short-circuit control signal changes state after the predetermined time period T; that is, the generated short-circuit control signal lasts for the predetermined time period T.

Figure 8:
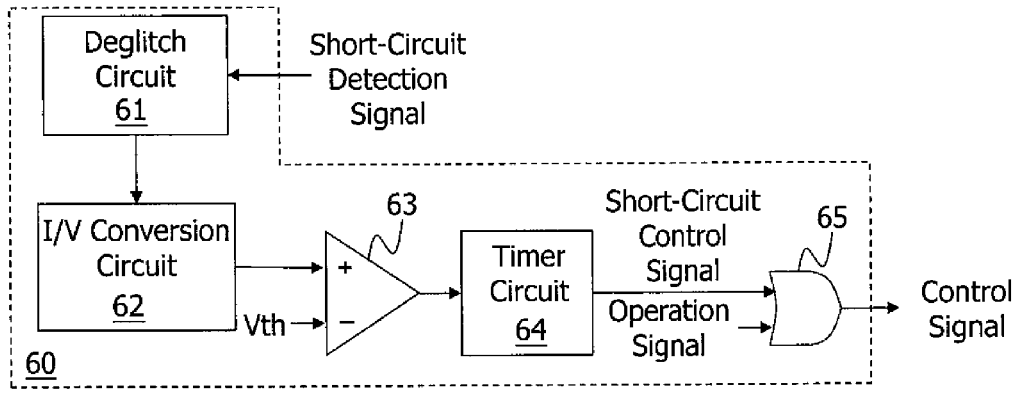
FIG. 8 shows a sixth embodiment of the present invention.

FIG. 8 shows a sixth embodiment of the present invention. As shown in the figure, an abnormal condition handling circuit 60 may further include a logic circuit 65 besides a deglitch circuit 61, an I/V conversion circuit 62, a comparison circuit 63, and a timer circuit 64. (The logic circuit 65 is not necessarily an OR gate as shown in the figure; it can be other types of logic circuits, depending on the forms of its inputted signals.) The logic circuit 65 is coupled to the timer circuit 64, and performs a logic operation of the short-circuit control signal and the operation signal to generate the control signal. As described previously, the operation signal is a signal to operate the first transistor P1 or N1 in normal operation, that is, to control the first transistor P1 or N1 when the output node OUT is not short-circuited. The logic operation of the short-circuit control signal and the operation signal takes the short-circuit condition of the output node OUT into consideration, so it will generate the lowest waveforms of FIGS. 3 and 4.

Figure 9:
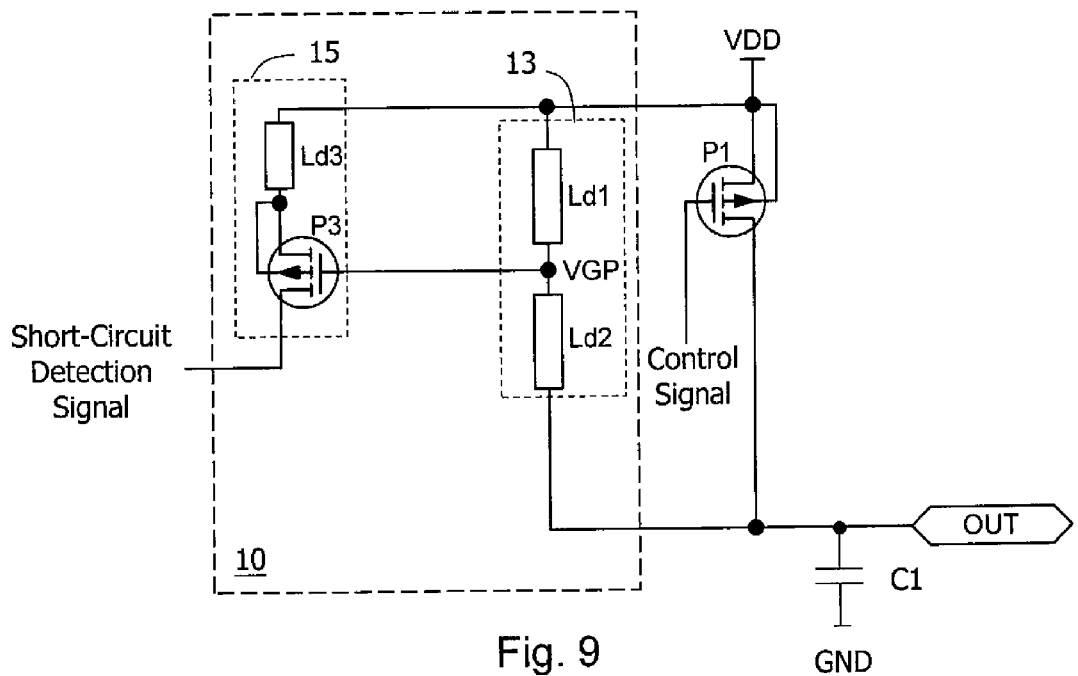
FIG. 9 shows a seventh embodiment of the present invention.

FIG. 9 shows a seventh embodiment of the present invention. This embodiment omits the enable switch circuit 11, and thus the determination circuit 13 will generate the determination signal at the node VGP at all times. When the first transistor P1 is conductive, the determination signal indicates whether the output node OUT is short-circuited to the ground level GND or the very low level, and the short-circuit detection signal generated in this time period is meaningful. When the first transistor P1 is not conductive, the determination signal cannot indicate whether the output node OUT is short-circuited to the ground level GND or the very low level, and therefore the short-circuit detection signal generated in this time period is not meaningful. However, and the short-circuit detection signal can be properly processed so that the not-meaningful period of the short-circuit detection signal does not affect the correct operation of the circuitry. For example, a circuit (such as the abnormal condition handling circuit) receiving the short-circuit detection signal can be enabled only when the first transistor P1 is conductive, or a logic circuit is provided to perform a logic operation on the short-circuit detection signal (converted to a digital voltage signal, for example) and the operation signal, and then the result of the logic operation is inputted to a circuit coupled to the short-circuit detection signal (such as the abnormal condition handling circuit), etc. From another perspective, in this embodiment shown in FIG. 9, when the output node OUT is in the abnormal condition (for example short-circuited), the short-circuit detection signal will maintain at the same level; and when the output node OUT is in the normal condition, the short-circuit detection signal will switch between different levels. Thus, a determination can be made as to whether the output node OUT is short-circuited according to whether the short-circuit detection signal is switching.

Figure 10:
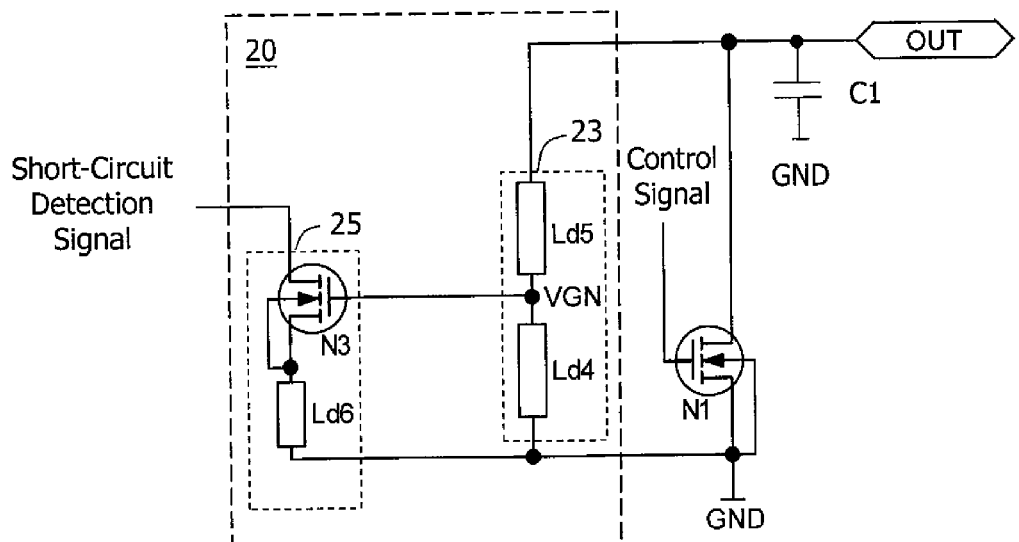
FIG. 10 shows an eighth embodiment of the present invention.

FIG. 10 shows an eighth embodiment of the present invention. This embodiment is similar to FIG. 9 in that the enable switch circuit 21 is omitted. The details of the rest of the circuit are similar to the embodiment of FIG. 9 and therefore are not repeated here.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. For another example, the positive and negative input terminals of a comparator are interchangeable, with corresponding amendments of the circuits processing these signals. For yet another example, the positions of the deglitch circuit, the I/V conversion circuit, the comparison circuit, and the timer circuit are not limited to the order shown in the figures; their positions are changeable. For yet another example, the second resistant circuit Ld2 and the third resistant circuit Ld3 are not necessarily required, and one or both of them may be omitted. In view of the foregoing, the spirit of the present invention should cover all such and other modifications and variations, which should be interpreted to fall within the scope of the following claims and their equivalents.

What is claimed is:

1. A short-circuit detection circuit for detecting whether an output node is short-circuited to a first predetermined level, wherein the output node is coupled to a capacitive load circuit, and the output node is also coupled to another node having a second predetermined level via a first transistor switch circuit controlled by a control signal, the short-circuit detection circuit comprising:
   a determination circuit coupled between the output node and the node having the second predetermined level, which, when enabled, generates a determination signal according to whether the output node is short-circuited to the first predetermined level; and
   a second transistor switch circuit, which generates a short-circuit detection signal according to the determination signal, wherein the second transistor switch circuit includes:
      a current path having a first end coupled to the node having the second predetermined level and a second end for generating the short-circuit detection signal, and
      a transistor switch on the current path for controlling the conduction of the current path, the transistor switch being controlled by the determination signal so that when the transistor switch is conductive, the current path conducts a current from the node having the second predetermined level to the second end of the current path or conducts a current from the second end of the current path to the node having the second predetermined level.

2. The short-circuit detection circuit of claim 1, further comprising an enable switch circuit, which is controlled by the control signal to enable the determination circuit.

3. The short-circuit detection circuit of claim 1, wherein the second switch circuit further includes a resistant circuit coupled between the transistor switch and the node having the second predetermined level.

4. The short-circuit detection circuit of claim 1, wherein the determination circuit includes a first resistant circuit and a second resistant circuit connected in series, and wherein the determination signal is related to a division voltage at a node between the first resistant circuit and the second resistant circuit.

5. The short-circuit detection circuit of claim 1, further comprising an abnormal condition handling circuit which includes a deglitch circuit for removing a noise from the short-circuit detection signal and a comparison circuit coupled to the deglitch circuit for generating a short-circuit control signal according to a level of the short-circuit detection signal.

6. The short-circuit detection circuit of claim 5, wherein the abnormal condition handling circuit further includes a current-to-voltage conversion circuit, which is coupled to the deglitch circuit, for generating a voltage signal according to the short-circuit detection signal when the short-circuit detection signal is a current signal.

7. The short-circuit detection circuit of claim 5, wherein the abnormal condition handling circuit further includes a timer circuit, which is coupled to the comparison circuit, so that the generated short-circuit control signal lasts for a predetermined period of time.

8. The short-circuit detection circuit of claim 5, wherein the abnormal condition handling circuit further includes a logic circuit, which performs a logic operation according to the short-circuit control signal and an operation signal to generate the control signal for controlling the first switch circuit, wherein when the output node is not short-circuited to the first predetermined level, the first switch circuit is controlled by the operation signal, and when the output node is short-circuited to the first predetermined level, the first switch circuit is controlled by the short-circuit control signal and is turned OFF.

9. The short-circuit detection circuit of claim 6, wherein the abnormal condition handling circuit further includes a logic circuit, which performs a logic operation according to the short-circuit control signal and an operation signal to generate the control signal for controlling the first switch circuit, wherein when the output node is not short-circuited to the first predetermined level, the first switch circuit is controlled by the operation signal, and when the output node is short-circuited to the first predetermined level, the first switch circuit is controlled by the short-circuit control signal and is turned OFF.

10. The short-circuit detection circuit of claim 7, wherein the abnormal condition handling circuit further includes a logic circuit, which performs a logic operation according to the short-circuit control signal and an operation signal to generate the control signal for controlling the first switch circuit, wherein when the output node is not short-circuited to the first predetermined level, the first switch circuit is controlled by the operation signal, and when the output node is short-circuited to the first predetermined level, the first switch circuit is controlled by the short-circuit control signal and is turned OFF.

11. A short-circuit detection method for detecting whether an output node is short-circuited to a first predetermined level, wherein the output node is coupled to a capacitive load circuit, and the output node is also coupled to another node having a second predetermined level via a first switch circuit controlled by a control signal, the short-circuit detection method comprising:
  receiving the control signal, and coupling or not coupling the output node to the second predetermined level according to the control signal;
  generating a determination signal according to a voltage difference between the output node and the second predetermined level; and
  generating a short-circuit detection signal according to the determination signal, wherein the step of generating the short-circuit detection signal according to the determination signal includes:
    providing a current path having a first end coupled to the node having the second predetermined level and a second end for generating the short-circuit detection signal, and
    controlling the conduction of the current path by the determination signal so that when the output node is short-circuited to the first predetermined level, the current path conducts a current from the node having the second predetermined level to the second end of the current path or conducts a current from the second end of the current path to the node having the second predetermined level.

12. The short-circuit detection method of claim 11, further comprising converting the short-circuit detection signal to a voltage signal when the short-circuit detection signal is a current signal.

13. The short-circuit detection method of claim 11, wherein the step of generating the determination signal includes:
  coupling a determination circuit between the output node and the node having the second predetermined level, the determination circuit including a first resistant circuit and a second resistant circuit connected in series, wherein the determination signal is related to a division voltage at a node between the first resistant circuit and the second resistant circuit; and
  determining whether to enable the determination circuit according to the control signal.

14. The short-circuit detection method of claim 11, further comprising: removing a noise from the short-circuit detection signal, and comparing it with a reference signal to generate a short-circuit control signal.

15. The short-circuit detection method of claim 14, further comprising: after comparing the short-circuit detection signal with the reference signal, counting a predetermined time so that the generated short-circuit control signal lasts for the predetermined time.

16. The short-circuit detection method of claim 14, further comprising: performing a logic operation according to the short-circuit control signal and an operation signal to generate the control signal.

17. The short-circuit detection method of claim 15, further comprising: performing a logic operation according to the short-circuit control signal and an operation signal to generate the control signal.

* * * * *